Sept. 28, 1943.   H. L. POTTER   2,330,741
METHOD OF ASSEMBLING RETAINERS
Filed Aug. 9, 1941   2 Sheets-Sheet 1

INVENTOR
HOWELL L. POTTER
BY
ATTORNEYS

Sept. 28, 1943.        H. L. POTTER        2,330,741
METHOD OF ASSEMBLING RETAINERS
Filed Aug. 9, 1941        2 Sheets-Sheet 2
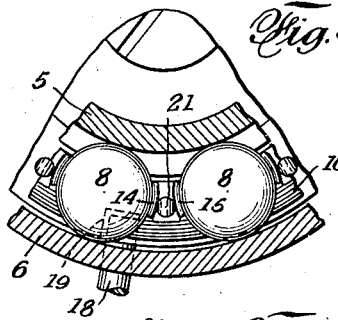
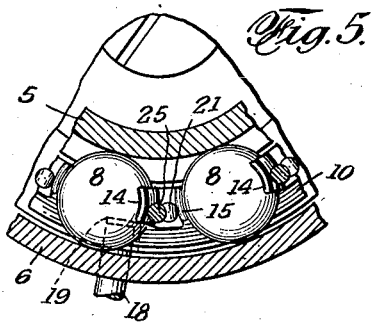
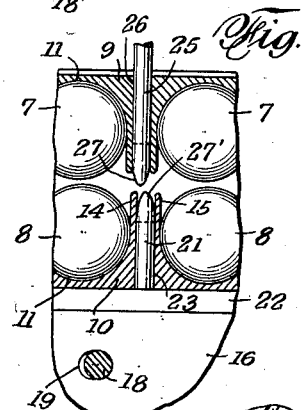
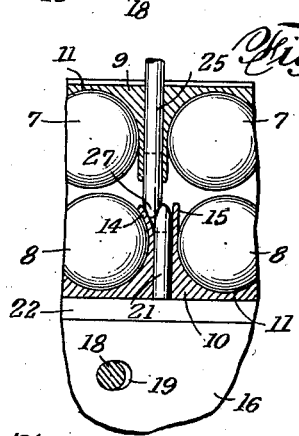
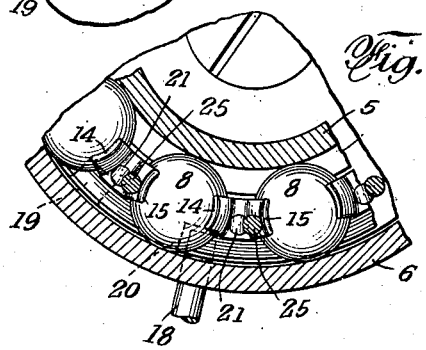
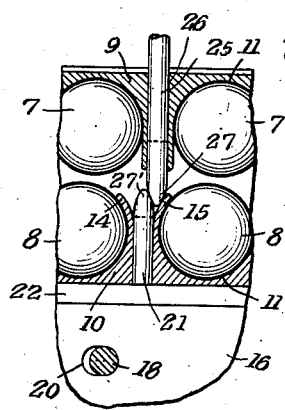
INVENTOR
HOWELL L. POTTER
BY
Mitchell Bahert
ATTORNEYS Patented Sept. 28, 1943

2,330,741

UNITED STATES PATENT OFFICE 2,330,741

METHOD OF ASSEMBLING RETAINERS

Howell L. Potter, New Britain, Conn., assignor to The Fafnir Bearing Company, New Britain, Conn., a corporation of Connecticut Application August 9, 1941, Serial No. 406,119

4 Claims. (Cl. 29—84)

My invention relates to a method of assembling a ball retainer with balls, particularly in a double row ball bearing, or a bearing where there is not free access to opposite sides of the retainer.

Ball retainers, such as cast bronze retainers, have heretofore commonly been assembled in back to back relationship with a double row ball bearing, that is to say, with deformable ball embracing fingers at the outsides of the bearings, in which position such fingers may be readily deformed into ball embracing position. With such retainers it is necessary to space the rows of balls far enough apart to provide sufficient space for the back to back retainers. Furthermore, considerable lubricant space is thus consumed and except when the ball rows are widely spaced, the retainer section is likely to be reduced to an undesirably low limit. Furthermore, with deep angular contact raceways, the ring section of the retainers, when assembled back to back, must be substantially reduced in a radial direction. In those cast bronze retainers which have been assembled with double row bearings with the deformable fingers extending inwardly (that is, opposite to the back to back relationship), the retainer ring section at the outer sides of the bearings has been substantially reduced or cut away.

It is a general object of my invention, therefore, to provide an improved method of assembling ball retainers in a double row ball bearing, wherein the deformable fingers face inwardly.

It is another object to provide an improved method of assembling ball retainers in a double row ball bearing, wherein the retainer fingers project inwardly, all without the necessity of substantially weakening the retainer section at any point.

Another object is to provide an improved method of assembling retainers which substantially fill the space between the face of the inner ring and the outer race, and which have deformable fingers projecting inwardly or toward each other.

Other objects and various features of novelty and invention will be hereinafter pointed out or will become apparent to those skilled in the art.

While the invention will be described in connection with a double row ball bearing, it is to be understood that in its broader aspects the invention is of utility in connection with bearings other than double row bearings, but in which reasonably free access cannot always be had to opposite sides of the bearing.

In the drawings which show, for illustrative purposes only, a novel and preferred form of apparatus for carrying out my improved method—

Fig. 3 is a fragmentary horizontal sectional view through the bearing shown in Fig. 1, the section being taken just above the lower retainer and parts being in position before deformation of the retainer fingers;

Fig. 4 is a generally vertical sectional view through parts shown in Fig. 3;

Fig. 5 is a view similar to Fig. 3, but illustrating parts in position after deformation of some of the bendable retainer fingers;

Fig. 6 is a generally vertical sectional view through parts shown in Fig. 5;

Fig. 7 is a view similar to Fig. 5, but illustrating the parts in position after deforming the remaining bendable fingers;

Fig. 8 is a view similar to Fig. 6 but illustrates the parts in positions assumed in Fig. 7.

Figure 2:
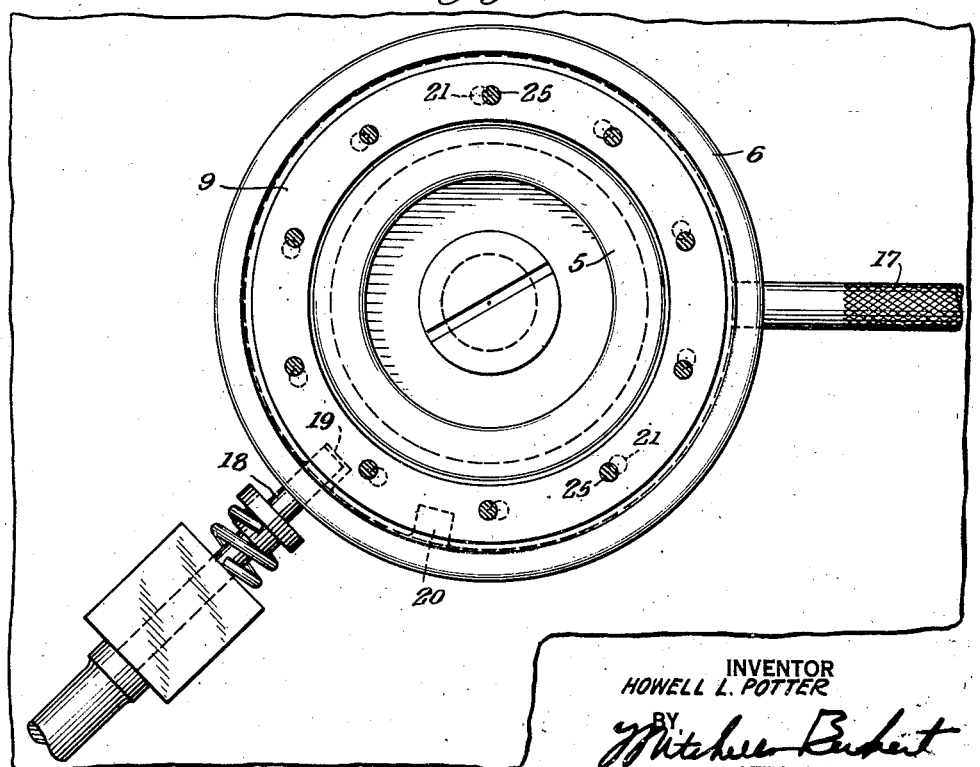
Fig. 2 is a horizontal sectional view taken substantially in the plane of the line 2—2 of Fig. 1.

The double row bearing illustrated includes an inner ring 5 and an outer ring 6, each of which is provided with two spaced raceways for receiving two separate rows of balls 7—7, 8—8, respectively. The ball grooves of the inner and outer rings are preferably arranged for angular contact engagement with the balls, as will be understood. Each row of balls is provided with a separate retainer, the retainer 9 for the row of balls 7—7, and corresponding retainer 10 for the row of balls 8—8. These retainers may be and preferably are duplicates of each other and are preferably of cast bronze. The retainers, as is common, have ball pockets 11—11 for the balls, which embrace about half the diameter of the balls, and deformable fingers 12—13 and 14—15 project beyond the ball pockets and are of such size that they may be deformed into ball embracing position relatively to the balls held in the pockets. Such bronze retainers are often cast and are finished in satisfactory fashion merely by being die struck with slightly oversize balls. The retainers as appear particularly in Fig. 2 are of such ring section or radial extent as to substantially fill the radial space between the inner and outer rings, and the fingers 12—13, 14—15 project inwardly or toward each other into the general zone between the two rows of balls. The retainers, after the fingers have been deformed into ball embracing positions, are designed to ride the balls and are preferably free of contact with either the inner or the outer ring. The retainer section is quite substantial at the outer sides of the double row ball bearing where the ball load is heaviest. With double row ball bearings, wherein the balls have quite substantial angular contact with the inner and outer rings, the retainers ride the balls in the general zone of their polar axes where the rotation is, of course, the least, and consequently retainer wear is reduced to a minimum.

My invention relates particularly to an improved method of deforming the bendable fingers which face toward each other in the generally central zone of the bearing and are consequently normally quite inaccessible for deformation. I have provided means which project into the bearing, preferably from opposite sides, for wedging or otherwise deforming the bendable fingers into ball embracing positions. Such deforming means in the preferred form pass through holes extending through at least one of the retainers between each pair of deformable fingers, such as the fingers 14—15, and means may extend through the other retainer in similar manner, or, when one of the retainers is assembled with its row of balls and the fingers deformed by conventional methods a single anvil or wedging means may extend through a retainer, for example the upper retainer, to assist in deforming the fingers of the lower retainer. However, in the preferred form, the retainers have holes for the deforming means so that all of the corresponding fingers of one retainer may be deformed at one operation.

In the form of apparatus shown, I provide a rotatable or indexible base member 16, which may be rotated or indexed by a handle 17, and which may be held in indexed position as by means of a spring pressed index pin 18 engageable in an index hole or slot 19 or a second index hole or slot 20. The base member 16 carries anvil or wedging means, which means may be in the form of pins 21 projecting from a supporting plate 22 carried by the base member 16. The plate 22 may support the lower retainer 10 and is preferably of a size to freely fit between the inner and outer rings. The retainer 10 is preferably provided with holes 23, which extend axially through the retainer and between the bendable prongs or fingers 14—15. These anvils, supports, tools, or wedging pins 21 are preferably tapered or wedge-shaped at the top, as indicated at 27', and preferably extend about as far inwardly as do the bendable fingers 14—15. The base member 16, together with pin members 21, correspond in general to a die on a press platen. What corresponds to a punch member may be provided for cooperating with the die portion for bending the fingers 14—15. In the form illustrated, I employ a punch head 24 which may be guided in any suitable manner, and which may be actuated as by means of a treadle or the like. The head 24 preferably carries a plurality of wedging means or tools in the form of pins 25 having the same circumferential spacing as the corresponding lower pins 21. In a double row bearing with duplicate retainers, the upper retainer 9 is provided with holes or bores 26 for the passage of the wedging pins 25. The retainer holes 23 and 26 are advantageously of a size to more or less snugly receive the corresponding wedging pins so as to give lateral support thereto and avoid undue bending stresses thereon during the distortion of the bendable fingers. The lower ends of the pins 25 are preferably wedged or tapered as indicated at 27 for coaction with the ends of the pins 21 and with the bendable fingers.

Figure 1:
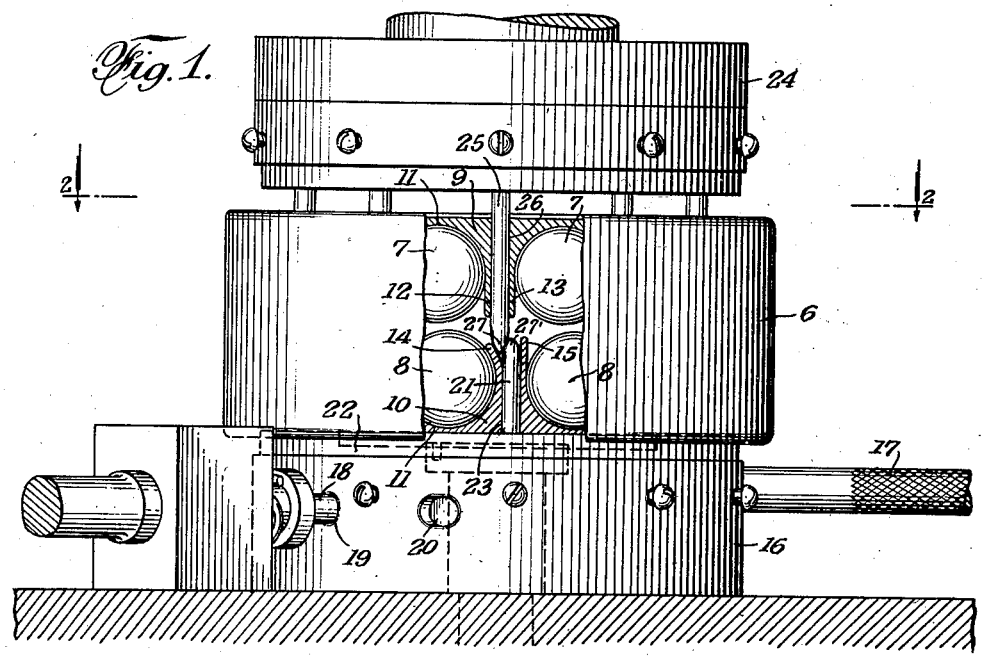
Fig. 1 is a fragmentary front view in elevation of a machine for performing the method, parts being broken away to illustrate interior features.

In following the method with my improved apparatus, a bearing with retainers 9—10 assembled with the balls is put on the base member 16 with the pins 21 projecting through the holes 23 in the lower retainer. The index pin 18 may be positioned in the index hole or slot 19 and when the base member is so held in indexed position the desired predetermined relative angular positions of the pins 21—25 will be substantially as shown in Fig. 4. It will, of course, be understood that ordinarily the axial holes in the two retainers will not line up so as to receive the oppositely disposed wedging pins, and therefore the base member 16 is first rotated so as to permit entry of the upper pins 25 in the holes 26 in the upper retainer. Thereafter, the base member is rotated until the index pin 18 may be inserted in, say, the index hole 19. During this relative rotation of the two retainers, one or both rows of balls will be skidded relatively to one or both of the rings. When the pins 21—25 are properly positioned, for example as shown in Fig. 4, the punch head 24 is lowered and the pins 25 will wedge between the anvil pins 21 (supported laterally in the bores 23) and the fingers 14 and will deform all of the fingers corresponding to the finger 14 and will curl the same about the balls into ball embracing positions. At the end of the finger deforming operation, the parts will be substantially as shown in Figs. 5 and 6. In other words, the retainers will have rotated relatively to each other a slight amount. It is for that reason that the index slots 19—20 are elongated to permit this slight relative rotation between the retainers during the deforming operation. Generally speaking, the fingers will be deformed into actual forcible contact with the balls and when the deforming pressure is released, the slight resiliency of the deformed fingers will cause them to spring back very slightly so as to just clear the ball surfaces and thus provide a snug but perfectly free running fit. When all of the fingers corresponding to the finger 14 have been deformed as described, the punch head 24 is raised so as to cause the wedging pin 25 to clear the pins 21 and the remaining fingers. The base member 16 is then indexed so as to cause the upper pins 25 to align with the opposite sides of the pins 21 (Figs. 7, 8), and when the punch head is operated the fingers 15 will be deformed as heretofore described. While the angular movement to reposition the pins from more or less the position of Fig. 1 to that of, say, Fig. 8 is slight, it will be usually more convenient, so far as indexing is concerned, to shift the base member 16 an angular distance of one whole ball assembly and cause the index pin 18 to engage an index slot 20. Thus, two widely separated slots will be employed and there is little likelihood that an operator will fail to deform both of the opposed fingers, whereas if a single indexing slot were employed and the base member 16 were shifted only a very small amount, there is some likelihood that the operator through carelessness or forgetfulness would deform only one set of fingers.

When one retainer, such as the retainer 10, has had all of the fingers deformed into ball embracing positions, the head 24 may be raised, the bearing removed and inverted so as to engage the lower pins 21 with the holes in the retainer 9, and the same procedure followed for deforming the fingers corresponding to the fingers 12—13 of the retainer 9.

A preferred form of procedure has been described. Of course many modifications and variations may be made; for example, one row of balls could be loaded and the retainer placed in position and the fingers deformed by conventional wedging means before the other retainer is assembled or even before the balls and the other row are put in place, so that my improved method would be employed only for deforming the fingers of the last retainer put in place. Again, it would be possible to deform the fingers one at a time rather than as described. Furthermore, in the broader aspects of the invention, a split resilient wedging pin, or a wedging pin having hinged wings, might be employed for simultaneously deforming both of the adjacent fingers 14—15. Many other modifications and variations will be apparent to those skilled in the art.

My improved method is rapid and effective. The resulting structure is a superior one in that the retainers practically fill the spaces between the inner and outer rings and the solid retainer section is at the outside where the ball load is heaviest. The retainers are not substantially weakened by the relatively small holes required for passage of the wedging pins. The retainers ride the balls in the general zones of their polar axes where the rotation is the least. By having the solid retainer plates at the outsides of the bearing and only the deformable fingers at the insides, the ball rows may be quite closely spaced, and, furthermore, a very substantial lubricant space is provided on the interior of the bearing where it is most advantageous.

While the invention has been described in considerable detail and a preferred method and preferred apparatus disclosed, it is to be understood that various changes and modifications may be made within the scope of the invention as defined in the appended claims.

I claim:

1. The method of assembling a ball retainer with one row of balls of a double row bearing which has a retainer for each row of balls, and wherein the ball retainers have deformable ball embracing fingers located in the zone between the two retainers, which method comprises, inserting a tool through one of said retainers in a generally axial direction and into engagement with a deformable finger on the other of said retainers, inserting a tool in a generally axial direction through the said other of said retainers into wedging engagement with said first tool, and forcing said tools generally axially inwardly relatively to each other to cause said first tool to bend the deformable finger in engagement therewith into ball embracing position.

2. The method of assembling a ball retainer with one row of balls of a double row bearing which has a retainer for each row of balls, and wherein the ball retainers have deformable ball embracing fingers located in the zone between the two retainers, which method comprises, inserting a backing-up tool through one of said retainers into the space between adjacent deformable fingers thereon, and inserting a wedging tool through the other of said retainers and into the space between said first tool and one of the deformable fingers adjacent thereto to bend said one of said fingers into ball embracing position while said tools serve to mutually support each other against substantial distortion.

3. The method of assembling one ball retainer with one row of balls of a double row bearing which has a retainer for each row of balls, and wherein said one ball retainer has deformable ball embracing fingers located in the zone between the two retainers, which method comprises, providing a substantially rigid support adjacent a finger of said one retainer, inserting a tool through a generally axially extending hole in the retainer opposite said one retainer and forcing the end of said tool between said support and the deformable finger on said one retainer to deform the same into ball embracing position, and repeating the above operation to deform other fingers of the retainer.

4. The method of assembling one ball retainer with one row of balls of a double row bearing which has a retainer for each row of balls, and wherein said one ball retainer has a pair of oppositely deformable ball embracing fingers located in the zone between the two retainers and between each pair of adjacent balls of said one row of balls, which method comprises, providing a substantially rigid support between the fingers of a pair of said fingers, inserting a tool through a generally axially extending hole in the retainer opposite said one retainer, forcing the end of said tool between said support and one of the deformable fingers of the pair adjacent thereto to deform said one finger into ball embracing position, and then forcing the tool between said support and the other finger of said last mentioned pair of fingers to deform said other finger into ball embracing position.

HOWELL L. POTTER.